US011649877B2

(12) United States Patent
Hadi

(10) Patent No.: US 11,649,877 B2
(45) Date of Patent: May 16, 2023

(54) ELASTOMER SPRING/DAMPER

(71) Applicant: DRiV Automotive Inc., Lake Forest, IL (US)

(72) Inventor: Rod Hadi, Grass Lake, MI (US)

(73) Assignee: DRiV Automotive Inc., Lake Forest, IL (US)

(*) Notice: Subject to any disclaimer, the term of this patent is extended or adjusted under 35 U.S.C. 154(b) by 301 days.

(21) Appl. No.: 16/777,255

(22) Filed: Jan. 30, 2020

(65) Prior Publication Data
US 2020/0248776 A1     Aug. 6, 2020

Related U.S. Application Data

(60) Provisional application No. 62/801,279, filed on Feb. 5, 2019.

(51) Int. Cl.
| | | |
|---|---|---|
| *F16F 13/06* | (2006.01) | |
| *F16F 13/04* | (2006.01) | |
| *B60G 15/06* | (2006.01) | |
| *B60G 17/00* | (2006.01) | |

(52) U.S. Cl.
CPC ............ *F16F 13/04* (2013.01); *B60G 15/066* (2013.01); *B60G 17/00* (2013.01); *B60G 2202/31* (2013.01); *B60G 2500/00* (2013.01); *B60G 2800/162* (2013.01); *F16F 2228/066* (2013.01)

(58) Field of Classification Search
CPC ...... F16F 1/40; F16F 1/41; F16F 13/04; F16F 13/06; F16F 2228/066; B60G 15/066; B60G 17/00; B60G 2202/31; B60G 2500/00; B60G 2204/125; B60G 2800/162

USPC ........................................ 267/201, 219, 293
See application file for complete search history.

(56) References Cited

U.S. PATENT DOCUMENTS

| | | | | |
|---|---|---|---|---|
| 2,486,741 A | * | 11/1949 | Gabriel | ................... F16F 1/406 |
| | | | | 213/40 R |
| 2,639,141 A | * | 5/1953 | Gabriel | ................... B60N 2/506 |
| | | | | 267/293 |
| 2,724,588 A | | 11/1955 | Sheets | |
| 3,537,696 A | * | 11/1970 | Webster, Jr. | .............. F16F 1/40 |
| | | | | 267/293 |
| 3,729,101 A | * | 4/1973 | Brambilla | ................ B61G 9/04 |
| | | | | 213/45 |
| 4,085,832 A | * | 4/1978 | Gaines | ................... F16F 3/093 |
| | | | | 267/140 |

(Continued)

FOREIGN PATENT DOCUMENTS

| | | |
|---|---|---|
| CA | 2410167 | 11/2001 |
| DE | 2923290 | 12/1979 |

(Continued)

OTHER PUBLICATIONS

International Search Report for International Application PCT/US2020/015861, dated Jun. 17, 2020.

*Primary Examiner* — Thomas W Irvin
(74) *Attorney, Agent, or Firm* — Burris Law, PLLC

(57) ABSTRACT

A shock absorber includes a first end fitting connected to a first telescoping member, a second end fitting connected to a second telescoping member, the first and second telescoping members being telescopically mounted relative to each other. An elastomeric spring/damper is disposed between the first telescoping member and the second telescoping member.

19 Claims, 5 Drawing Sheets

(56) References Cited

U.S. PATENT DOCUMENTS

| | | | | |
|---|---|---|---|---|
| 4,415,146 A | * | 11/1983 | Sitko | F16F 7/09 |
| | | | | 267/202 |
| 4,756,512 A | * | 7/1988 | Toms, Jr. | F16F 1/40 |
| | | | | 267/141.1 |
| 4,962,916 A | | 10/1990 | Palinkas | |
| 5,104,101 A | * | 4/1992 | Anderson | F16F 13/06 |
| | | | | 267/141.1 |
| 5,417,446 A | * | 5/1995 | Pileggi | B62K 25/08 |
| | | | | 188/282.5 |
| 5,495,923 A | | 3/1996 | Bruski et al. | |
| 5,908,123 A | * | 6/1999 | Huggins | B61G 11/12 |
| | | | | 188/287 |
| 6,290,038 B1 | | 9/2001 | Jensen et al. | |
| 6,328,294 B1 | | 12/2001 | Palinkas | |
| 6,443,437 B1 | * | 9/2002 | Beyene | F16F 1/371 |
| | | | | 267/141.1 |
| 6,471,198 B2 | * | 10/2002 | Herbst | F16F 1/40 |
| | | | | 267/293 |
| 6,520,360 B1 | * | 2/2003 | Withall | F16F 1/40 |
| | | | | 213/7 |
| 7,681,869 B2 | | 3/2010 | Digernes | |
| 8,356,807 B2 | * | 1/2013 | Kerr | F16F 3/0876 |
| | | | | 213/40 R |
| 8,844,205 B2 | | 9/2014 | Michael et al. | |
| 11,331,972 B2 | * | 5/2022 | Hadi | B60G 11/24 |
| 2011/0316209 A1 | * | 12/2011 | Kerr | B60G 13/02 |
| | | | | 267/293 |

FOREIGN PATENT DOCUMENTS

| | | |
|---|---|---|
| DE | 3135298 | 3/1983 |
| DE | 3041549 | 9/1986 |
| DE | 4100155 | 7/1992 |
| DE | 4214013 | 11/1993 |
| EP | 0407261 | 1/1991 |
| EP | 0453701 | 10/1991 |
| FR | 2602293 | 2/1988 |
| JP | 2012092854 | 5/2012 |

* cited by examiner

ELASTOMER SPRING/DAMPER

CROSS-REFERENCE TO RELATED APPLICATIONS

This application claims priority to and the benefit of U.S. provisional application No. 62/801,279, filed on Feb. 5, 2019. The disclosure of the above application is incorporated herein by reference.

FIELD

The present disclosure relates to vehicle wheel suspension systems and more particularly to springs/dampers for a vehicle wheel suspension system.

BACKGROUND

The statements in this section merely provide background information related to the present disclosure and may not constitute prior art.

In a vehicle, shock absorbers are used in combination with springs to reduce the effect of bumps in the road, thereby providing improved ride quality and vehicle handling. Shock absorbers are utilized in combination with suspension springs so that the shock absorber dampens the spring oscillations. Common shock absorbers use hydraulic fluid and/or pneumatic chambers along with valving to absorb excess energy from the springs. Shock absorbers have a tendency to be heavy and also require fluid sealing, which can result in periodic maintenance or repair.

These issues related to shock absorbers, among other issues related to notice, vibration, and harshness (NVH), and weight in motor vehicles, are addressed by the present disclosure.

SUMMARY

This section provides a general summary of the disclosure and is not a comprehensive disclosure of its full scope or all of its features.

According to one form of the present disclosure, a shock absorber includes a first end fitting connected to a first telescoping member and a second end fitting connected to a second telescoping member. The first and the second telescoping members are telescopically mounted relative to each other. An elastomeric system is disposed between the first telescoping member and the second telescoping member and is configured to provide variable stiffness and dampening characteristics along a length of the shock absorber between the first end fitting and the second end fitting.

In a variation, the first telescoping member includes a first seat and the second telescoping member includes a second seat, and the elastomeric system is disposed between the first seat and the second seat. In another such variation, the first telescoping member includes a first tubular portion with the first seat extending radially outward from the first tubular portion and the second telescoping member includes a second tubular portion with the second seat extending radially outward from the second tubular portion.

In another variation, the elastomeric system includes a plurality of elastomeric rings stacked upon one another. In another such variation, the plurality of elastomeric rings are made from at least two different elastomeric materials. In a yet other such variation, at least two of the plurality of elastomeric rings have different geometric shapes. In yet another such variation, at least two of the plurality of elastomeric rings have a different height.

In a further variation, the elastomeric system includes a monolithic body. In a further such variation, the monolithic body includes a plurality of apertures extending through the monolithic body.

In a yet further variation, the elastomeric system is disposed within the first and second telescoping members.

In another form, a shock absorber comprises a first end fitting connected to a first telescoping member including a first seat and a second end fitting connected to a second telescoping member including a second seat. The first and the second telescoping members are telescopically mounted relative to each other. An elastomeric system is disposed between the first seat and the second seat, and the elastomeric system is configured to provide variable stiffness and dampening characteristics along a length of the shock absorber between the first end fitting and the second end fitting.

In a variation, the first telescoping member includes a first tubular portion with the first seat extending radially outward from the first tubular portion and the second telescoping member includes a second tubular portion with the second seat extending radially outward from the second tubular portion.

In another variation, the elastomeric system includes a plurality of elastomeric rings stacked upon one another. In another such variation, the plurality of elastomeric rings are made from at least two different elastomeric materials. In yet another such variation, at least two of the plurality of elastomeric rings have different geometric shapes. In a further such variation, at least one of the plurality of elastomeric rings has an undulating surface against an adjacent elastomeric ring. In a yet further such variation, at least two of the plurality of elastomeric rings have a different height.

In a further variation, the elastomeric system includes a monolithic body. In a further such variation, the monolithic body includes a plurality of apertures extending through the monolithic body.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
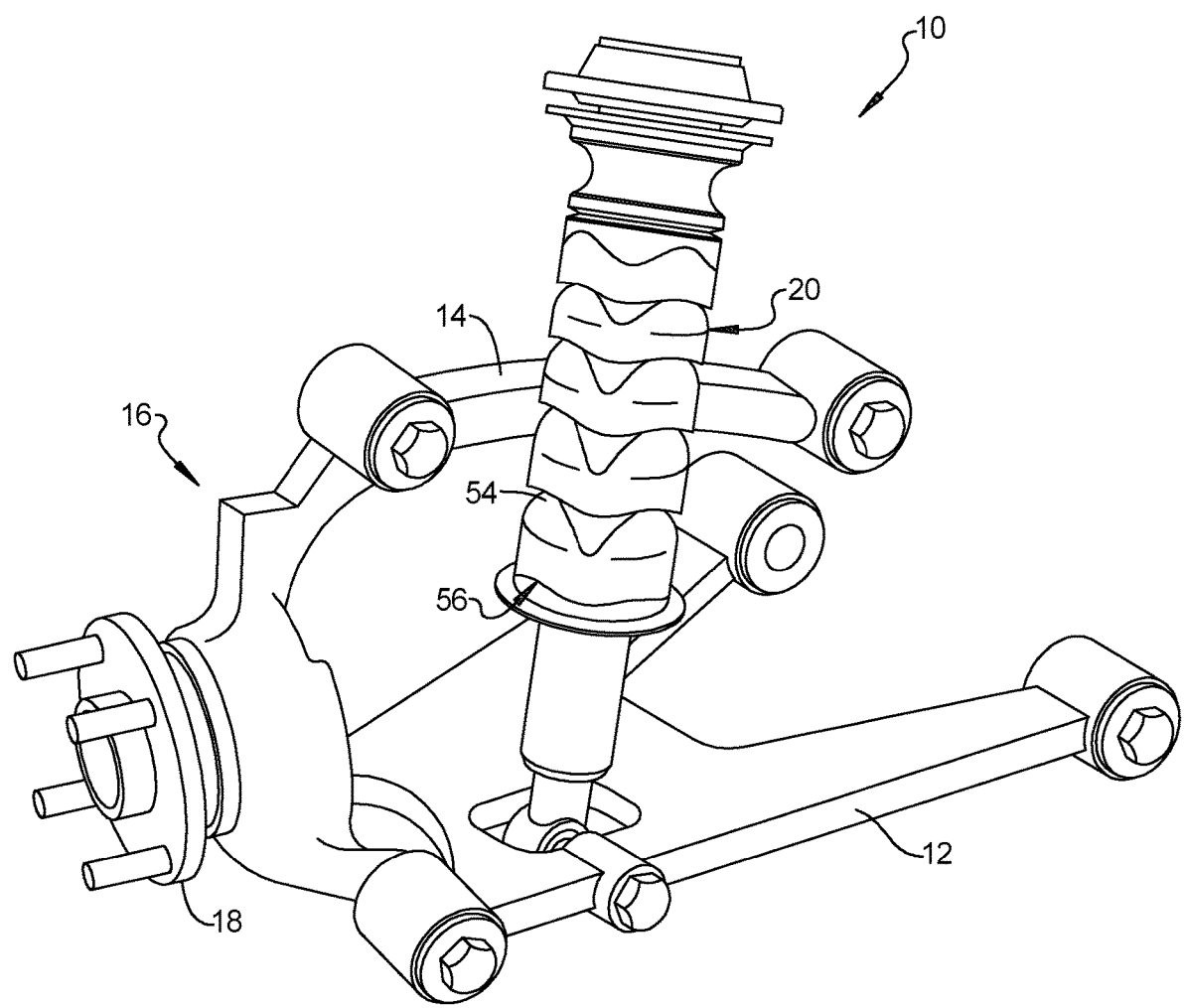
FIG. 1 is a perspective view of a vehicle wheel suspension system having an elastomeric spring/damper according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a vehicle wheel suspension system 10 is shown including a lower suspension arm 12 and an upper suspension arm 14 adapted to be mounted to a vehicle body or frame (not shown). A steering knuckle 16 is pivotally supported by the upper and lower suspension arms 14, 12. A wheel hub 18 is supported by the steering knuckle 16. The wheel hub 18 is adapted to support a wheel (not shown).

Figure 2:
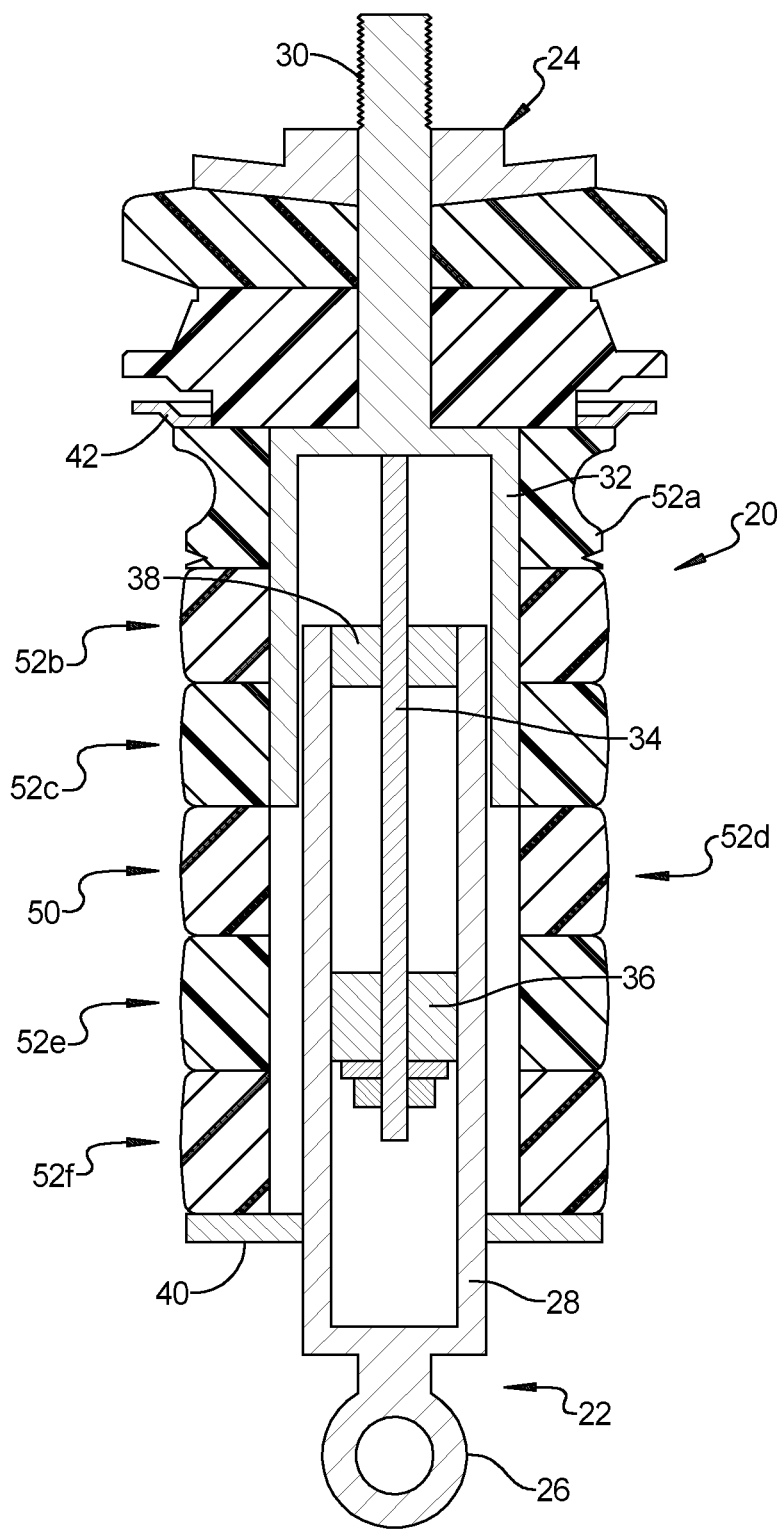
FIG. 2 is a cross-sectional view of the elastomeric spring/damper of FIG. 1.

A shock absorber 20 is connected to the lower suspension arm 12. With reference to FIG. 2, the shock absorber 20 includes a lower end portion 22 (also referred to herein as a first telescoping member) and an upper end portion 24 (also referred to herein as a second telescoping member) that are telescopically mounted relative to one another. The lower end portion 22 includes a lower end fitting 26 (also referred to herein as a first end fitting) that is connected to the lower suspension arm 12 and includes a first cylindrical body 28 (also referred to herein as a first tubular portion) attached to the lower end fitting 26. The upper end portion 24 includes an upper end fitting 30 (also referred to herein as a second end fitting) that is adapted to be connected to the body or frame of a vehicle and includes a second cylindrical body 32 (also referred to herein as a second tubular portion) attached to the upper end fitting 30. The first cylindrical body 28 is telescopically received in the second cylindrical body 32. The upper end fitting 30 can further include a piston rod 34 supporting a piston 36 within the first cylindrical body 28. The piston rod 34 is further guided by a bearing 38 supported at an open end of the first cylindrical body 28. The piston rod 34 with the piston 36 and bearing 38 guide the upper end portion 24 in a telescoping manner relative to the lower end portion 22.

The lower end portion 22 includes a first seat 40 extending radially outward from the first cylindrical body 28 and the upper end portion 24 includes a second seat 42 extending radially outward from the second cylindrical body 32. An elastomeric spring/damper 50 (also referred to herein as an elastomeric system) is disposed between the lower end portion 22 and the upper end portion 24 and is configured to provide variable stiffness and dampening characteristics along a length of the shock absorber 20 between the lower end fitting 26 and the upper end fitting 30. In a variation, the elastomeric spring/damper 50 is disposed between the first seat 40 and the second seat 42. In order to tune the elastomeric spring/damper to provide desired stiffness and dampening characteristics, the elastomeric spring/damper 50 can take on various forms.

As shown in FIGS. 1 and 2, the elastomeric spring/damper 50 can include a plurality of elastomeric rings 52a-52f. The plurality of elastomeric rings 52a-52f can be stacked upon one another. The elastomeric rings 52a-52f can be made from the same or different (e.g., at least two) materials. The materials can include any material exhibiting elastic or rubber-like properties which may include various forms of rubbers, silicone and foams including, but not limited to, natural rubber, isoprene rubber, butadiene rubber, Chloroprene rubber, Butyl rubber, Styrene-butadiene Rubber Nitrile rubber, Hydrogenated Nitrile Rubbers, ethylene propylene rubber, ethylene propylene diene rubber, Epichlorohydrin rubber, Polyacrylic rubber, Silicone rubber, Fluorosilicone Rubber, Fluoroelastomers, Perfluoroelastomers and open and closed cell foams. Further, these elastomeric rings 52a-52f may include optional structural fillers, such as carbon fibers by way of example, to increase stiffness and dampening characteristics.

In addition, the elastomeric rings 52a-52f can be the same or different sizes and/or shapes (e.g., at least two of the plurality of elastomeric rings can have different geometric shapes). The elastomeric rings 52a-52f can have undulating upper and/or lower surfaces 54, 56 (best shown in FIG. 1) so that the peak portions of the undulations provide increased absorption of forces. In such a manner, at least one of the elastomeric rings 52a-52f may have an undulating surface against an adjacent elastomeric ring. In addition, the elastomeric rings 52a-52f can be provided with apertures or other geometric features to provide desired stiffness and dampening characteristics.

Figure 3:
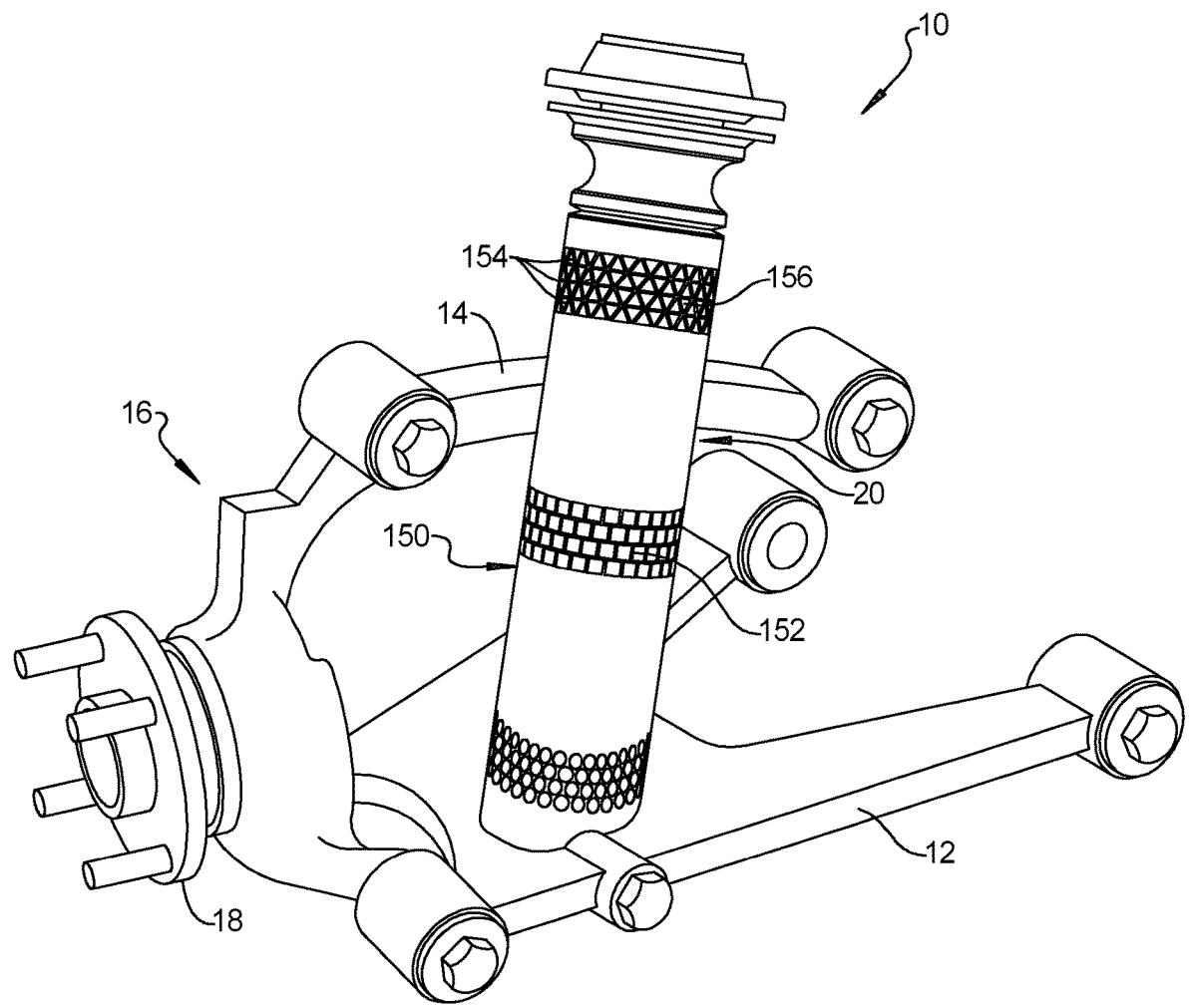
FIG. 3 is a perspective view of a vehicle wheel suspension system having an alternative elastomeric spring/damper according to the principles of the present disclosure.
Figure 4:
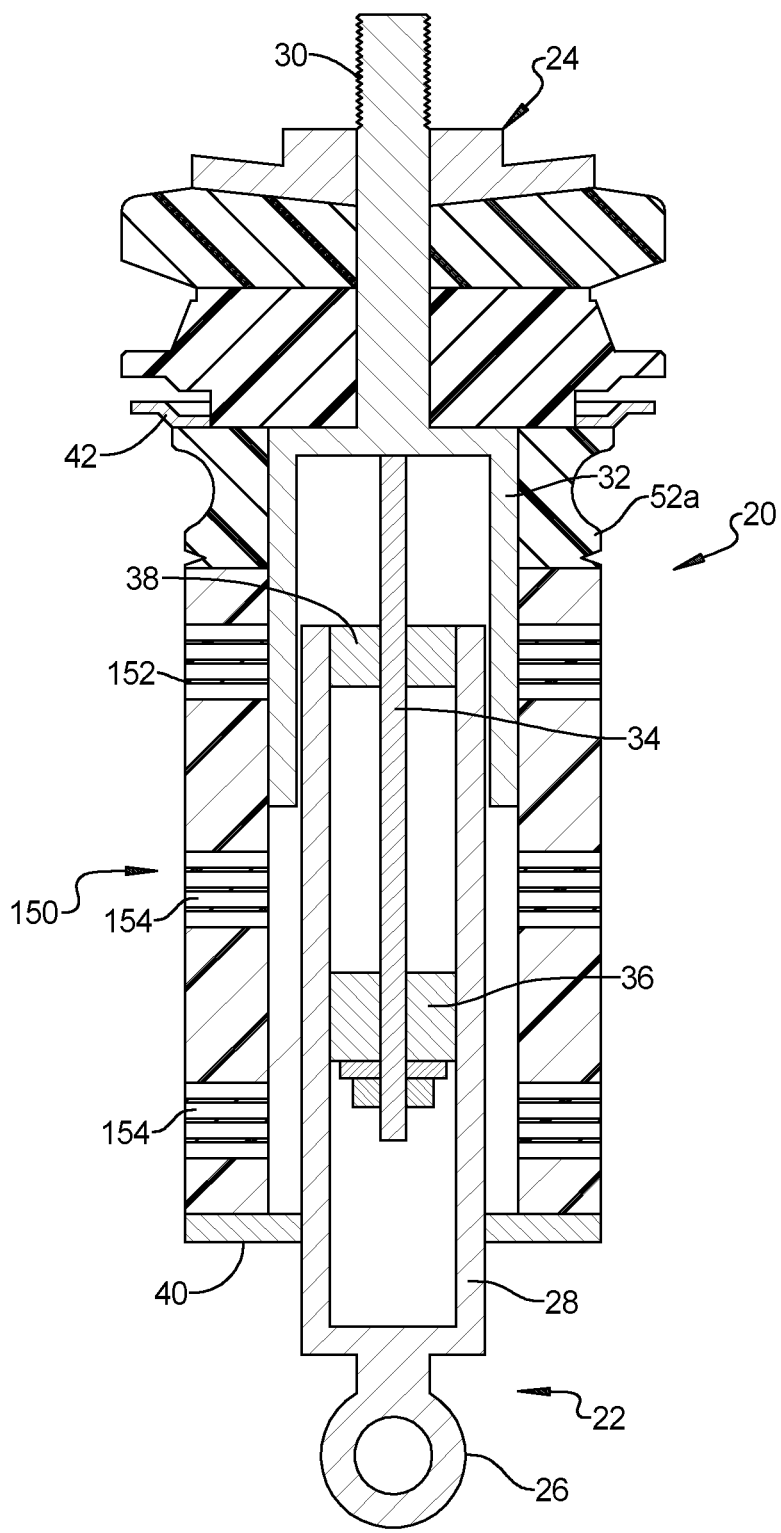
FIG. 4 is a cross-sectional view of the alternative elastomeric spring/damper of FIG. 3.

As an alternative, as shown in FIGS. 3 and 4 wherein common elements include the same reference numerals as described in FIGS. 1 and 2, the elastomeric spring/damper 150 can be formed as a single body 152, which in one form is cylindrical as shown, (also referred to herein as a monolithic body) and is provided with apertures 154 extending at least partially through the monolithic body 152 of varying sizes, shapes and patterns in order to provide the elastomeric spring/damper with desired stiffness and dampening characteristics along its length. The cylindrical body 152 can include any material exhibiting elastic or rubber-like properties which may include various forms of rubbers, silicone and foams, including but not limited to natural rubber, isoprene rubber, butadiene rubber, Chloroprene rubber, Butyl rubber, Styrene-butadiene Rubber Nitrile rubber, Hydrogenated Nitrile Rubbers, ethylene propylene rubber, ethylene propylene diene rubber, Epichlorohydrin rubber, Polyacrylic rubber, Silicone rubber, Fluorosilicone Rubber, Fluoroelastomers, Perfluoroelastomers and open and closed cell foams. Further, the monolithic body 152 may include optional structural fillers, such as carbon fibers by way of example, to increase stiffness and dampening characteristics.

As shown in FIG. 3, the apertures 154 can be triangular or diamond shaped and provide diagonal elastomeric structures 156 between the apertures 154. Alternative shaped apertures and different spacing and patterns can be used to provide desired stiffness and dampening characteristics. Accordingly, the geometric shapes illustrated herein should not be construed as limiting the scope of the present disclosure.

Figure 5:
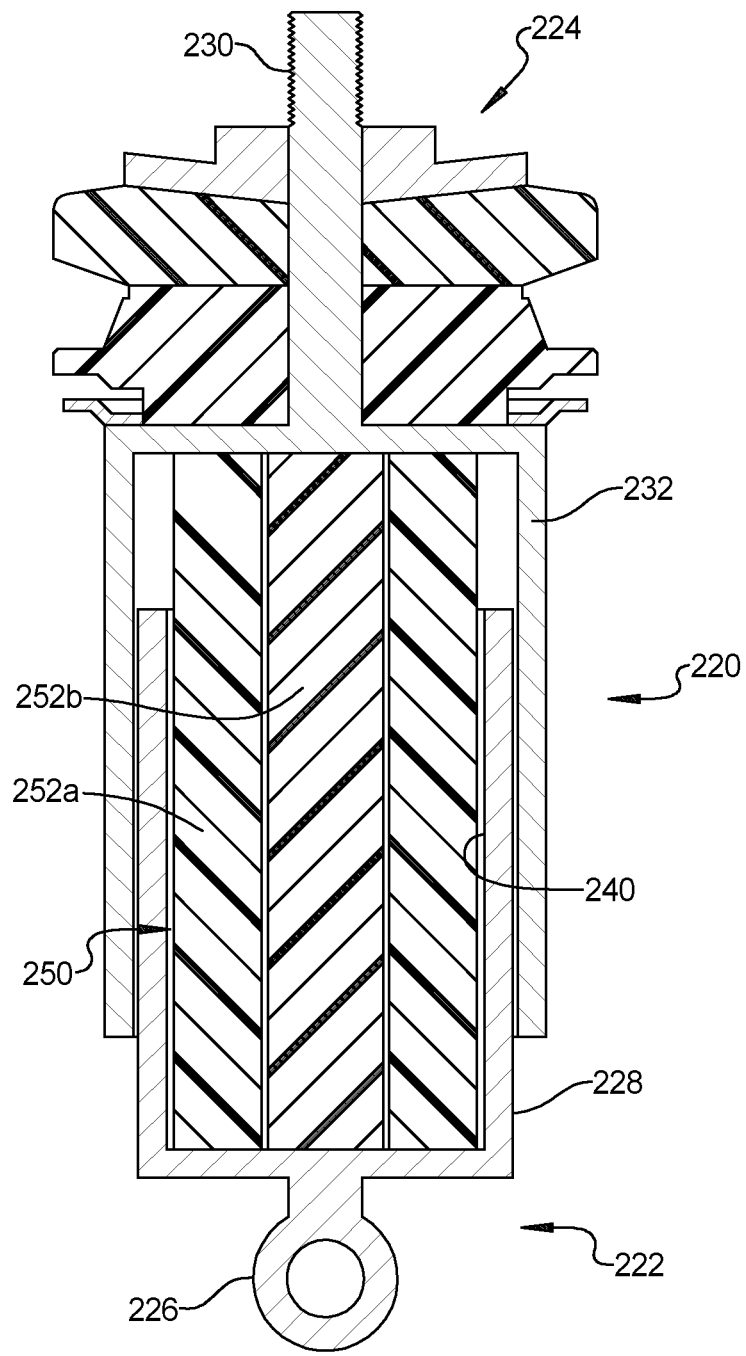
FIG. 5 is a cross-sectional view of a further alternative elastomeric spring/damper according to the principles of the present disclosure.

With reference to FIG. 5, the shock absorber 220 includes a lower end portion 222 (also referred to herein as a first telescoping member) and an upper end portion 224 (also referred to herein as a second telescoping member) that are telescopically mounted relative to one another. The lower end portion 222 includes a lower end fitting 226 (also referred to herein as a first end fitting) that is connected to the lower suspension arm 12 and includes a first cylindrical body 228 (also referred to herein as a first tubular portion) attached to the lower end fitting 226. The upper end portion 224 includes an upper end fitting 230 (also referred to herein as a second end fitting) that is adapted to be connected to the body or frame of a vehicle and includes a second cylindrical body 232 (also referred to herein as a second tubular portion)

attached to the upper end fitting 30. The first cylindrical body 228 is telescopically received in the second cylindrical body 232.

The first cylindrical body 228 and the second cylindrical body 232 define a chamber 240. An elastomeric spring/damper 250 (also referred to herein as an elastomeric system) is disposed within the chamber 240 and between the lower end portion 222 and the upper end portion 224 and is configured to provide variable stiffness and dampening characteristics along a length of the shock absorber between the lower end fitting 226 and the upper end fitting 230. In order to tune the elastomeric spring/damper to provide desired stiffness and dampening characteristics, the elastomeric spring/damper 250 can take on various forms. As shown in FIG. 5, the elastomeric spring/damper 250 can include a plurality of elastomeric members 252a-252b. The plurality of elastomeric members 252a-252b can be stacked upon one another. The elastomeric members 252a-252b can be made from the same or different (e.g., at least two) materials. For example, the elastomeric member 252a can be in a form of an annular ring and the elastomeric member 252b can be in a form of a cylindrical rod disposed within the annular ring 252a. Each of the elastomeric members 252a, 252b can be separated into a plurality of components and can be made from different materials. The materials can include any materials exhibiting elastic or rubber-like properties which may include various forms of rubbers, silicone and foams including but not limited to natural rubber, isoprene rubber, butadiene rubber, Chloroprene rubber, Butyl rubber, Styrene-butadiene Rubber Nitrile rubber, Hydrogenated Nitrile Rubbers, ethylene propylene rubber, ethylene propylene diene rubber, Epichlorohydrin rubber, Polyacrylic rubber, Silicone rubber, Fluorosilicone Rubber, Fluoroelastomers, Perfluoroelastomers and open and closed cell foams. The elastomeric members 252a-252b can also be provided with apertures or other geometric features to provide desired stiffness and dampening characteristics of the elastomeric members 252a-252b. Further, the elastomeric members 252a-252b may include optional structural fillers, such as carbon fibers by way of example, to increase stiffness and dampening characteristics.

The elastomeric spring/damper of the present disclosure replaces a heavy metal spring and a damper system that is commonly filled with fluid and requires expensive seals and valving to perform properly. The valving and seals can leak and may require maintenance. Accordingly, the elastomeric spring/damper provides a significant weight reduction and eliminates the need for expensive seals and valving.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A shock absorber comprising:
a first end fitting connected to a first telescoping member;
a second end fitting connected to a second telescoping member, the first and second telescoping members being telescopically mounted relative to each other; and
an elastomeric system disposed between the first telescoping member and the second telescoping member, wherein the elastomeric system is disposed outwardly relative to the first and second telescoping members and comprises a variable distribution of at least one of: rings, apertures, and materials along a length of the elastomeric system configured to provide variable stiffness and dampening characteristics along a length of the shock absorber between the first end fitting and the second end fitting.

2. The shock absorber according to claim 1, wherein the first telescoping member includes a first seat and the second telescoping member includes a second seat, wherein the elastomeric system is disposed between the first seat and the second seat.

3. The shock absorber according to claim 2, wherein the first telescoping member includes a first tubular portion with the first seat extending radially outward from the first tubular portion and the second telescoping member includes a second tubular portion with the second seat extending radially outward from the second tubular portion.

4. The shock absorber according to claim 1, wherein the elastomeric system includes a plurality of elastomeric rings stacked upon one another.

5. The shock absorber according to claim 4, wherein the plurality of elastomeric rings are made from at least two different elastomeric materials.

6. The shock absorber according to claim 4, wherein at least two of the plurality of elastomeric rings have different geometric shapes.

7. The shock absorber according to claim 4, wherein at least one of the plurality of elastomeric rings has an undulating surface against an adjacent elastomeric ring.

8. The shock absorber according to claim 4, wherein at least two of the plurality of elastomeric rings have a different height.

9. The shock absorber according to claim 1, wherein the elastomeric system includes a monolithic body.

10. The shock absorber according to claim 9, wherein the monolithic body includes a plurality of apertures extending through the monolithic body.

11. A shock absorber comprising:
a first end fitting connected to a first telescoping member including a first seat;
a second end fitting connected to a second telescoping member including a second seat, the first and second telescoping members being telescopically mounted relative to each other; and
an elastomeric system disposed between the first seat and the second seat, wherein the elastomeric system is disposed outwardly relative to the first and second telescoping members and comprises a variable distribution of at least one of: rings, apertures, and materials along a length of the elastomeric system configured to provide variable stiffness and dampening characteristics along a length of the shock absorber between the first end fitting and the second end fitting.

12. The shock absorber according to claim 11, wherein the first telescoping member includes a first tubular portion with the first seat extending radially outward from the first tubular portion and the second telescoping member includes a second tubular portion with the second seat extending radially outward from the second tubular portion.

13. The shock absorber according to claim 11, wherein the elastomeric system includes a plurality of elastomeric rings stacked upon one another.

14. The shock absorber according to claim 13, wherein the plurality of elastomeric rings are made from at least two different elastomeric materials.

15. The shock absorber according to claim 13, wherein at least two of the plurality of elastomeric rings have different geometric shapes.

16. The shock absorber according to claim 13, wherein at least one of the plurality of elastomeric rings has an undulating surface against an adjacent elastomeric ring.

17. The shock absorber according to claim 13, wherein at least two of the plurality of elastomeric rings have a different height.

18. The shock absorber according to claim 11, wherein the elastomeric system includes a monolithic body.

19. The shock absorber according to claim 18, wherein the monolithic body includes a plurality of apertures extending through the monolithic body.

\* \* \* \* \*